United States Patent [19]

Mayer

[11] Patent Number: 4,763,637
[45] Date of Patent: Aug. 16, 1988

[54] STONE SAW

[76] Inventor: Wolfgang Mayer, 102 Nonntalerhauptstrasse, A-5020 Salzburg, Austria

[21] Appl. No.: 22,803
[22] PCT Filed: Jun. 20, 1986
[86] PCT No.: PCT/AT86/00046
  § 371 Date: Feb. 5, 1987
  § 102(e) Date: Feb. 5, 1987
[87] PCT Pub. No.: WO86/07560
  PCT Pub. Date: Dec. 31, 1986

[30] Foreign Application Priority Data

Jun. 20, 1985 [AT] Austria ................... 1831/85
Jun. 20, 1985 [AT] Austria ................... 1832/85

[51] Int. Cl.⁴ .......................................... B28D 1/08
[52] U.S. Cl. ........................................ 125/21; 51/141;
  83/71; 83/74; 83/789; 83/814
[58] Field of Search ...... 125/21; 51/135 BT, 170 EB,
  51/141; 83/71, 74, 789, 814

[56] References Cited

U.S. PATENT DOCUMENTS

| | | | |
|---|---|---|---|
| 451,199 | 4/1891 | Kesseler | 125/21 |
| 2,055,351 | 9/1936 | Hormel | 51/170 EB |
| 2,674,238 | 4/1954 | Dessureau et al. | 125/21 |
| 2,866,448 | 12/1958 | Dessureau et al. | 125/21 |
| 3,395,595 | 8/1968 | Braun et al. | 83/174 |
| 4,016,856 | 4/1977 | McLaughlin | 125/21 |
| 4,067,312 | 1/1978 | Tessner | 125/21 |

FOREIGN PATENT DOCUMENTS 371761 7/1983 Austria .
0048240 3/1982 European Pat. Off. .
2803357 8/1978 Fed. Rep. of Germany .

*Primary Examiner*—Robert P. Olszewski
*Attorney, Agent, or Firm*—Kurt Kelman

[57] ABSTRACT

A stone saw comprises a revolving sawing rope, a backing roller supporting the revolving sawing rope at each end of a sawing portion on one side of the sawing rope axis against cutting pressure exerted upon the sawing rope, the cutting pressure causing radial wear on the backing rollers, a feed drive for feeding the sawing rope in a revolving direction over the backing rollers, and housings supporting the backing rollers and pivotally adjustable about the sawing rope axis in dependence on the revolving direction of the sawing rope, the backing rollers being mounted in the housings transversely adjustably to the axes thereof and to the sawing rope axis. A clearance sensor is associated with, and radially spaced from, the backing roller for detecting the clearance between the sensor and the backing roller, the distance varying with the radial wear of the backing roller, the clearance sensor emitting a control signal corresponding to the detected clearance. An adjustment drive is arranged to displace the backing roller towards the sawing rope axis, and a controller receiving the control signal controls the adjustment drive in response thereto for displacing the backing roller in dependence on the radial wear thereof.

12 Claims, 4 Drawing Sheets

STONE SAW

BACKGROUND OF THE INVENTION

This invention relates to a stone saw comprising a revolving sawing rope, which is backed against the cutting pressure by backing rollers at both ends of at least one sawing portion, also comprising a feed drive and housings in which the backing rollers are mounted and which are pivotally adjustable about the axis of the sawing rope in dependence on the direction of the feed movement.

In such stone saws, which are known from AT-B-No. 371,761, the pivotal adjustment of the backing rollers about the axis of the sawing rope has the result that the forces which are exerted on the backing rollers owing to the cutting pressures applied will be at right angles to the axes of rotation of said rollers so that the side faces of the rope-guiding groove of the backing roller will not be subjected to substantial loads. This ensures that the wear of the rope-guiding grooves will be minimized and the rope will be exactly guided even after a prolonged operation.

Whereas such a guidance of the rope is necessary for an exact contour sawing it is not adequate for that purpose. For an exact control of the direction of the cut, the axis of rotation of each of the housings in which the backing rollers are mounted must coincide with the axis of the sawing rope. The inevitable wear of the rope-guiding grooves will result in a shift of the axis of the sawing rope relative to the structurally defined axis of rotation of the housing so that, e.g., curves having a small radius of curvature can no longer be cut as exactly as is required.

SUMMARY OF THE INVENTION

For this reason it is an object of the invention to avoid that basic disadvantage of known stone saws of the kind described first hereinbefore and to ensure that the rope will be guided in such a manner that an exact contour sawing can be performed in spite of the inevitable wear.

That object is accomplished in accordance with the invention by mounting the backing rollers in the housings for an adjustment transversely to their axis and to the axis of the sawing rope, and displaceable toward the axis of the sawing rope by a correcting drive operable in dependence on the radial wear of the backing rollers.

Because the backing rollers are readjusted by the correcting drive to the extent of the wear of the rope-guiding grooves, a shifting of the axis of the rope from the axis of rotation of the housing will be avoided and the sawing rope will remain in position during a pivotal adjustment of the housing so that all requirements for an exact control of the line of cut are met.

But this result cannot be achieved if the sawing rope can lift from the backing rollers. To avoid this, the housings may be provided on that side of the axis of the sawing rope which is opposite to the backing rollers with pressure-applying rollers for the sawing rope and said pressure-applying rollers are offset along the axis of the sawing rope away from the sawing portion from those backing rollers which are near the sawing portion. Regardless of variations of the diameter of the sawing rope and regardless of a wear of the backing rollers and the pressure-applying rollers, the spring-loaded pressure-applying rollers ensure a snug contact between the sawing rope and the backing rollers so that vibrations to which the rope may be excited outside the sawing portion will not be transmitted to the sawing portion. Because the pressure-applying roller is offset along the axis of the sawing rope away from the sawing portion from those backing rollers which are near the sawing portion, the configuration of the sawing rope adjacent to the sawing portion will be determined by the backing roller that is near the sawing portion rather than by the spring-loaded pressure-applying roller. In the design of the spring means for supporting the pressure applying rollers, care must only be taken to ensure that the natural frequency of the vibratory system comprising the springloaded pressure-applying rollers is not in the range of the vibrational frequencies of the sawing rope. The resilient pressure-applying rollers do not only ensure a vibrational frequencies of the sawing rope. The resilient pressure-applying rollers do not only ensure a vibrationless guidance of the rope but ensure also that the sawing rope, which is urged against the backing rollers by a predetermined force, will rotate the backing rollers without a slip so that the wear adjacent to the rope-guiding groove can be minimized.

Because the geometric configuration of the rope is determined by the readjustment of the backing rollers regardless of the wear of the rope-guiding grooves and of the sawing rope, the deflection of the sawing rope adjacent to its sawing portion can be utilized for the control of the feed drive in a manner which is known for a planar cut (U.S. Pat. No. 4,067,312). In case of a planar cut, a shift of the sawing rope in dependence on wear cannot affect the direction of the cut but such a shift will have very undesirable results during a cut along a curve. For this reason such feed control can be performed only if the guidance of the rope is independent of wear. Besides, it is not sufficient to provide a detector for indicating that the sawing rope has been deflected to the largest permissible extent, as has been taught in the prior art. For instance, during the cutting of a reentrant corner the permissible deflection will be smaller than during a cut along a straight line if a uniform quality of the cut is required throughout the length of the cut. These circumstances can be taken into account by mounting at least one housing carries a sensor, which is disposed between a backing roller and the sawing portion, in at least one housing to continuously detect the deflection of the rope, the feed drive being continuously adjustable in dependence on the progress of the cutting operation by a feedback controller which is connected to the sensor. In that case the feed drive can be controlled not only in such a manner that a predetermined, constant deflection of the sawing rope will be maintained during a cut at a given portion of the line of cut but the feed drive can also be controlled to provide a varying deflection of the rope when this is required, e.g., at a transition between two different portions of a curve to be cut. Said changes can be effected by a computer in accordance with a program.

In accordance with a further feature of the invention the readjustment of the backing rollers to an extent determined by the wear of the rope-guiding grooves and of the sawing rope can be controlled in a simple manner by fixing a clearance sensor for the sawing rope to one of the housings, the clearance sensor being associated with at least one backing roller and disposed on the opposite side thereof with respect to to the axis of the sawing rope. The clearance sensor delivers a signal to an open-loop controller for controlling the correcting drive for displacing the backing roller. When the clearance sensor indicates a shift of the sawing rope, the correcting drive will be operated to compensate said shift so that the desired configuration of the sawing rope will be preserved.

The adjustment of the backing rollers transversely to their axis of the sawing rope can be effected by different means. Particularly desirable conditions will be obtained if the backing rollers are mounted on adjustable eccentric axles because in that case there will be no need for sliding guides for the bearings for the backing rollers. For a readjustment of the backing rollers it will be sufficient to rotate the eccentric axles. This can be accomplished in a simple manner by means of a lever arm, which is connected to the eccentric axle and which is acted upon by the correcting drive.

It two sawing portions are arranged one behind the other, the sawing rope must be backed between the two sawing portions by two backing rollers, which are associated with respective sawing portions. If it can be assumed in such case that the backing rollers between the two sawing portions will be subjected to the same wear, said backing rollers can be adjusted in unison. For that purpose the adjustable eccentric axles of said backing rollers may be operatively interconnected by respective crank arms and by a link connecting the crank arms so that it will be sufficient to connect the correcting drive to one of the two eccentric axles. If it is assumed that the wear of the two backing rollers will be highly different, a clearance sensor for indicating the clearance from said sensor to the sawing rope and an open-loop controller connected to said clearance sensor must be associated with each of the backing rollers. But a different wear adjacent to the two backing rollers can usually be taken into account by the provision of a link which connects the two crank arms and which is adjustable in length.

If the backing rollers associated with two sawing portions arranged one behind the other are accommodated in a common housing, a common spring-loaded pressure-applying roller may be provided between said two backing rollers and may cooperate with both backing rollers. Such an arrangement will be very compact and will provide a highly effective barrier for vibrations of the rope. Spring-loaded pressure-applying rollers disposed each between two backing rollers may desirably be employed also in case of a single sawing portion or of externally disposed sawing portions.

To ensure that the advantages afforded by swivel mounts can be utilized also in connection with the yieldable mounting of spring-loaded pressure-applying rollers, each pressure-applying roller may be mounted on a pivoted lever, which has an axis of rotation that is parallel to the pressure-applying roller, and said lever may be supported on the housing by a spring. Compared to a displacement of the pressure applying rollers, the mounting of the pressure-applying rollers on a pivoted lever has also the advantage that the length of the lever can be selected to provide a desirable transmission ratio for the spring force and the spring excursion.

BRIEF DESCRIPTION OF THE DRAWINGS

The subject matter of the invention is shown by way of example on the drawing, in which.

DETAILED DESCRIPTION OF PREFERRED EMBODIMENT

Figure 1:
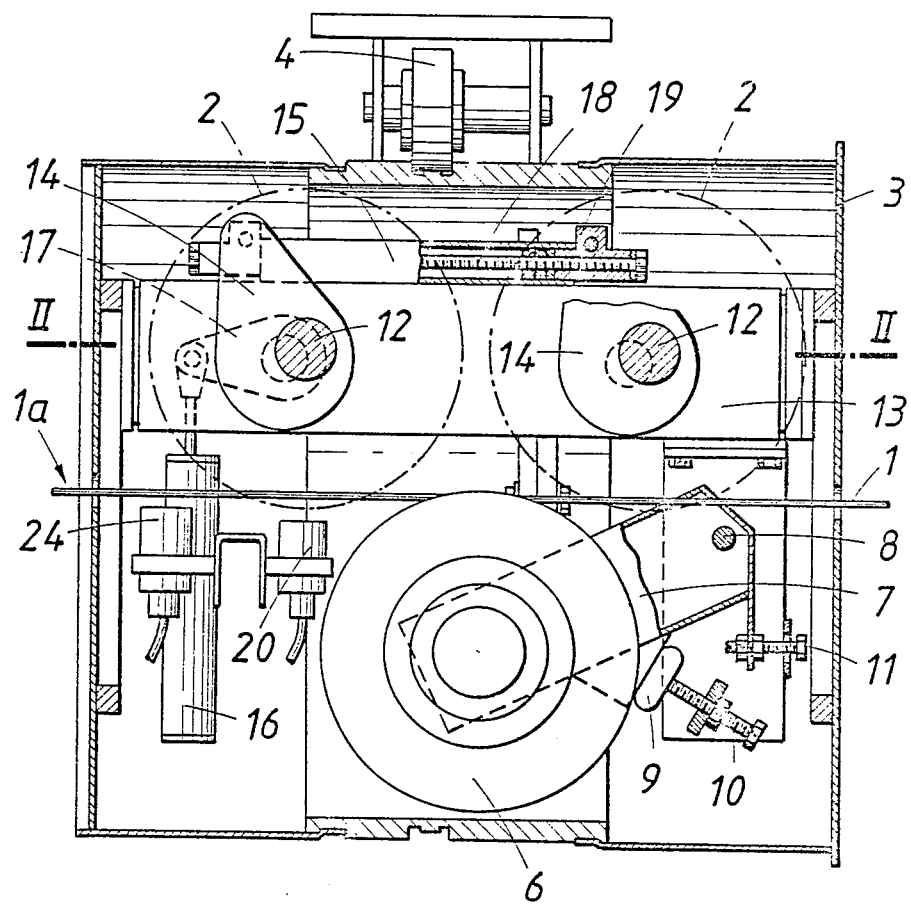
FIG. 1 is a simplified longitudinal sectional view showing means for supporting a sawing rope of a stone saw in accordance with the invention.
Figure 2:
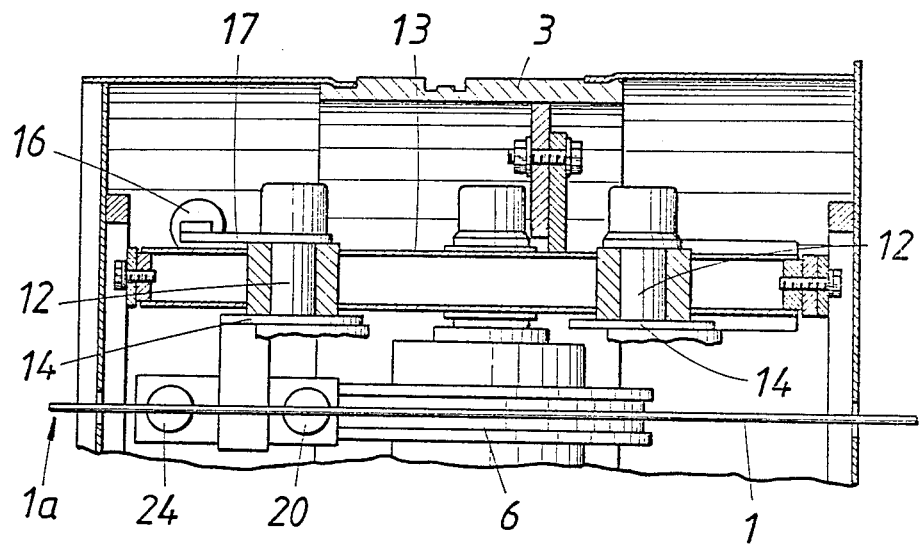
FIG. 2 is a fragmentary sectional view taken on line II—II in FIG. 1 and showing said rope-supporting means.
Figure 3:
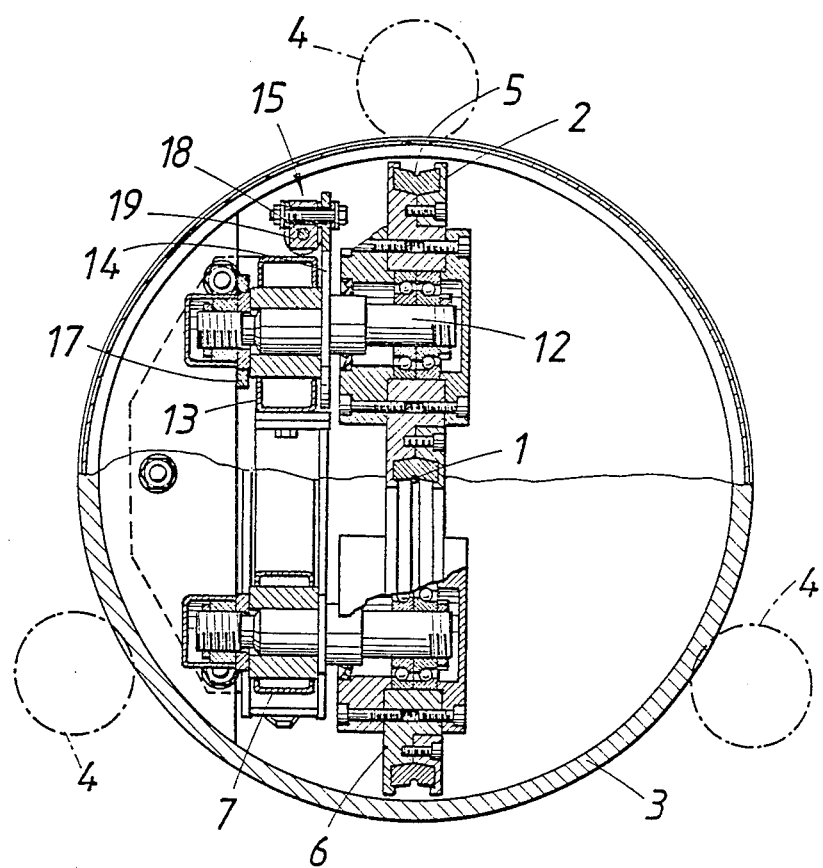
FIG. 3 is a transverse sectional view showing the rope-supporting means and FIG. 4 is a simplified block diagram showing the control means for controlling the feed drive and the correcting drive for readjusting the backing rollers.

A stone saw which is not shown in more detail comprises a sawing rope 1, which is backed against the cutting pressure by backing rollers 2 at both ends of a sawing portion. For that purpose the backing rollers 2 are mounted in a housing 3, which in the present embodiment is mounted by three rollers 4 for rotation about the axis of the sawing rope 1 and is rotated in dependence on the direction of the feed movement in such a manner that the cutting pressure on the sawing rope 1 can be taken up by the backing rollers 2 at right angles to their axes of rotation. As a result, the mounting of the backing rollers 2 will not be subjected to axial stresses. Because transverse forces are exerted, the rope-guiding grooves 5 of the backing rollers 2 are desirably stressed substantially in a radial direction so that the service life will be improved.

In addition to the two backing rollers 2, the housing 3 is provided with a pressure-applying roller 6 for forcing the sawing rope 1 against the backing rollers 2. That pressure applying roller 6 is disposed between the two backing rollers 2 on that side the axis of the sawing rope opposite to the backing rollers. The pressure-applying roller 6 is mounted on a pivoted lever 7, which is pivoted in the housing 3 on a pivot 8, which is parallel to the axes of rotation of the backing rollers 2. The lever 7 is supported by a spring 9, which in the present embodiment consists of a rubber spring and can be prestressed by means of an adjusting screw 10. The angular movement of the pivoted lever 7 is limited by a stop 11, which consists of a screw so that the stop can be adjusted. The spring 9 urges the pressure-applying roller 6 against the sawing rope 1 and urges the latter against the backing rollers 2 so that the sawing rope 1 will always be forced into the rope-guiding grooves 5 of the backing rollers 2. This will ensure a reliable guidance of the rope so that a transmission of any vibration of the rope to the sawing rope to the sawing portions 1a will be effectively prevented. The rubber spring provided in the present embodiment will damp vibrations and will thus tend to suppress a vibration of the rope. If the damping action of the rubber spring 9 is not sufficient or if other springs are used, the supporting means may comprise a vibration damper, which may be incorporated in a structural unit with the spring 9.

If the backing rollers 2 were mounted in fixed positions in the housing, a wear of the rope-guiding grooves 5 and of the sawing rope 1 would inevitably result in a shifting of the axis of the sawing rope so that the line of cut would be changed. In order to permit the axis of the sawing rope to be maintained in a given geometric relation to the axis of rotation of the housing 3, the backing rollers 2 are arranged to be displaceable transversely to their axis and to the axis of the sawing rope. In the present embodiment this is accomplished by mounting the backing rollers 2 on eccentric axles 12, which are mounted for a rotational adjustment in a beam 13 of the housing 3. To permit the eccentric axles 12 to be adjusted in unison, they are provided with respective crank arms 14, which are interconnected by a link 15. A rotational adjustment of the eccentric axles 12 is effected by means of a correcting drive 16, which is contained in and pivoted to the housing 3 and acts on a lever arm 17, which is connected to one of the eccentric axles 12. The link 15 connecting the two crank arms 14 is adjustable in length by means of a screw 18 for adjusting a nut 19, which is pivoted to one of the crank arms 14. A change of the length of the link 15 will result in a rotation of the crank arms 14 relative to each other and in different positions of the backing roller 2 relative to the rope so that non-symmetrical wear can be taken into account in a simple manner.

The wear of the backing rollers 2 is detected by a clearance sensor 20 for the sawing rope 1. That clearance sensor is mounted in a fixed position in the housing adjacent to at least one backing roller 2 on that side of the axis of the sawing rope opposite to the backing roller, and indicates the clearance between the clearance sensor 20 and the backing roller 2. If a wear of the ropeguiding groove 5 and/or of the sawing rope 1 is reflected by an increase of the clearance between the clearance sensor 20 and the backing roller 2, an open-loop controller 21 shown in FIG. 4 will actuate the correcting drive 16 so as to readjust the backing roller 2 until the sawing rope is again in its predetermined position, in which it is coaxial to the axis of rotation of the housing 3. In the block circuit diagram of FIG. 4 the backing roller 2 is shown to be adjustably held in a slide track 22.

In order to permit an operation with the highest possible cutting capacity and with a predetermined quality of the cut even in case of changing cutting conditions resulting, e.g., from the design of the line of cut or from local variations of the properties of the material being cut, the feed drive 23 is controlled in dependence on the deflection of the sawing rope 1a adjacent to the sawing portion 1. To that end a sensor 24 is ahead of one backing roller 2 and the sawing portion and serves to continuously detect the deflection of the sawing rope 1 in the plane in which the backing roller 2 is guided normal to its axis. Just as the clearance sensor 20, that sensor 24 consists of a non-contacting inductive or capacitive clearance sensor. Because the backing rollers 2 can be aligned by the rotation of the housing in dependence on the direction of the feed movement, the sawing rope 1 can be deflected by the cutting pressure only in the plane which is defined by the rope-guiding groove 5 of the backing rollers 2 so that the deflection of the sawing rope will exactly be reflected by the clearance between the sawing rope 1 and the sensor 24 as any shifting of the sawing rope resulting from wear will be compensated by the readjustment of the backing rollers 2. As a result, a feedback controller 25 which is connected to the sensor 24 can be used to control the feed drive 23 in dependence on the deflection of the sawing rope so that the feed control can be used to maintain a constant cutting pressure regardless of changing cutting conditions or in adaptation to the changing direction of the line of cut.

Figure 4:
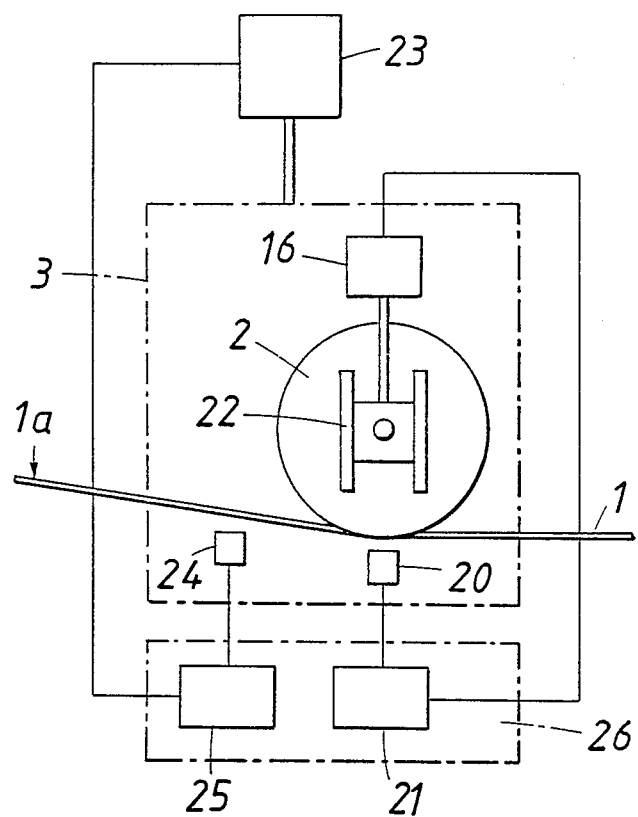

The feedback controller 25 and the open-loop controller 21 may be incorporated in a computer 26, as is shown in FIG. 4. It will be understood that such computer 26 can be used to define predetermined curves, which represent changing cutting pressures with which a cut of a constant quality can be ensured.

As the feed movement is performed by the transverse movement of the material being cut with respect to the sawing rope, the feed drive 23 may consist of any drive means which can effect such relative movement. For instance, the feed drive may comprise two motors, one of which drives the workpiece carriage whereas the other drives a frame which carries the housings 3, or, if the workpiece is stationary, the feed drive may comprise a motor for driving a portal and a motor for driving a frame, which is displaceable in the portal and carries the housings 3.

What is claimed is:
1. A stone saw comprising
 (a) a revolving sawing rope having an axis,
 (b) at least one backing roller supporting the revolving sawing rope at each end of a sawing portion on one side of the sawing rope axis against cutting pressure exerted upon the sawing rope, the cutting pressure causing radial wear on the backing rollers,
 (c) a feed drive for feeding the sawing rope in a revolving direction over the backing rollers,
 (d) housings supporting the backing rollers and pivotally adjustable about the sawing rope axis in dependence on the revolving direction of the sawing rope,
  (1) the backing rollers being mounted in the housings transversely adjustably to the axes thereof and to the sawing rope axis,
 (e) a clearance sensor associated with, and radially spaced from, at least one of the backing rollers for detecting the clearance between the sensor and the one backing roller, said distance varying with the radial wear of the one backing roller,
  (1) the clearance sensor emitting a control signal corresponding to the detected clearance,
 (f) an adjustment drive for displacing the one backing roller towards the sawing rope axis, and
 (g) a controller receiving the control signal and controlling the adjustment drive in response thereto for displacing the one backing roller in dependence on the radial wear thereof.
2. The stone saw of claim 1, wherein the clearance sensor is fixed to the housing for the one backing roller on a side of the sawing rope axis opposite to the one side.
3. The stone saw of claim 1, further comprising spring-loaded pressure-applying rollers for the sawing rope supported in the housings on a side of the sawing rope axis opposite to the one side, the pressure-applying rollers being arranged offset from the backing rollers in the direction of the sawing rope axis and outside the sawing portion.
4. The stone saw of claim 3, further comprising a pivoted lever mounting each pressure-applying roller, the lever having a pivot extending parallel to the pressure-applying roller, and a spring supporting the pivoted lever in the housing.
5. The stone saw of claim 4, wherein the spring is of rubber.
6. The stone saw of claim 5, further comprising a vibration damper supporting the pivoted lever.
7. The stone saw of claim 3, wherein two of said backing rollers are supported in each housing and the spring-load pressure-applying rollers are disposed between the two backing rollers.
8. The stone saw of claim 1, further comprising a sensor for detecting a deflection of the sawing rope and carried by at least one of the housings, the deflection detecting sensor being arranged along the sawing portion ahead of the backing roller supported in the one housing and emitting a control signal corresponding to the detected sawing rope deflection, and a controller receiving the control signal and controlling the feed drive in response thereto for feeding the sawing rope in dependence on the progress of the cutting operation.

9. The stone saw of claim 1, further comprising an adjustable eccentric axle mounting the one backing roller in the housing.

10. The stone saw of claim 9, wherein two of said backing rollers are mounted in each housing on respective eccentric axles, and further comprising respective crank arms connected to the eccentric axles, and a link connecting the crank arms for common adjustment of the eccentric axles.

11. The stone saw of claim 10, wherein the connecting link is adjustable in length.

12. The stone saw of claim 9, further comprising a lever arm connected to the eccentric axle, the adjusting drive acting upon the lever arm.

* * * * *